Nov. 3, 1953 — L. SPRARAGEN — 2,657,438
SEALING STRIP
Filed Aug. 5, 1948
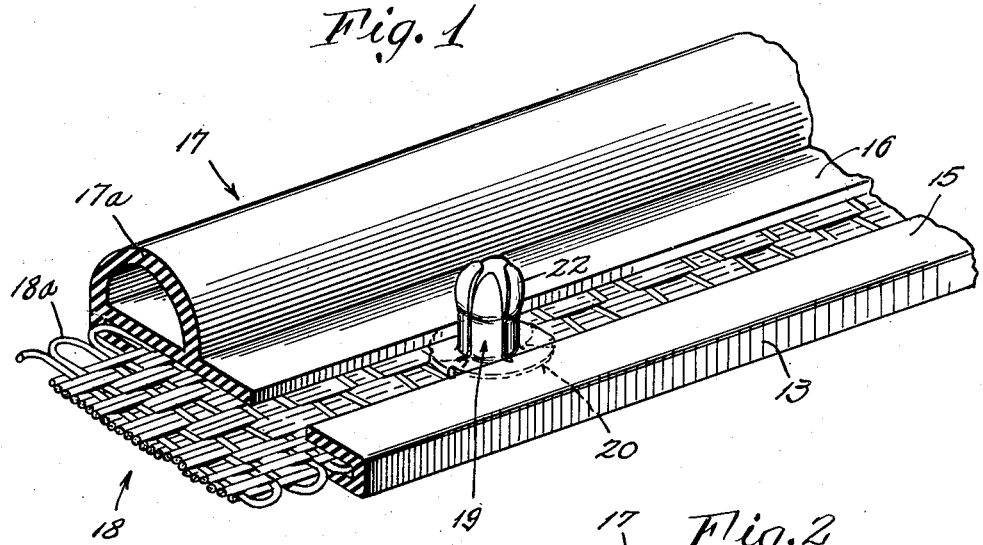
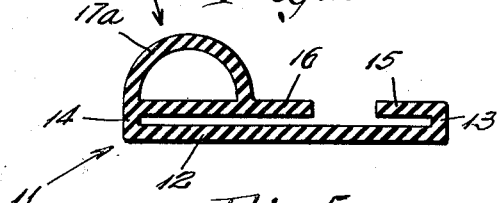
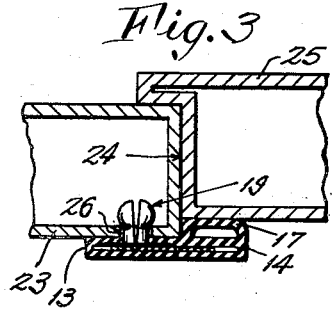
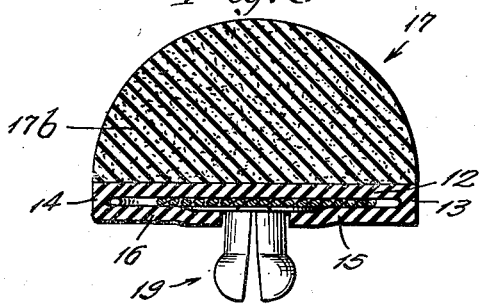
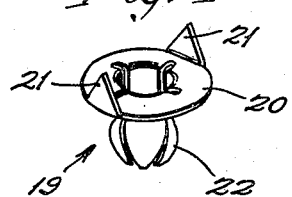
INVENTOR.
Louis Spraragen
BY
Johnson and Kline
ATTORNEYS Patented Nov. 3, 1953

2,657,438

UNITED STATES PATENT OFFICE 2,657,438

SEALING STRIP

Louis Spraragen, Bridgeport, Conn., assignor to Bridgeport Fabrics, Inc., Bridgeport, Conn., a corporation of Connecticut Application August 5, 1948, Serial No. 42,569

5 Claims. (Cl. 20—69)

1

The present invention relates to sealing strips such as utilized as weather strips for doors or the like closures or for beading strips.

The present invention relates to an assembled structure which may be manufactured cheaply and economically, which produces an efficient seal, and in which the mounting means is concealed.

In carrying out the invention, a compressible sealing bead is provided with a base having a preformed channel formed therein in which a stiff attaching strip having securing means is assembled in and held in position by the base. The attaching strip is provided with fastening means for mounting the sealing strip on a support. The fastening means are so related that they secure the sealing strip to the supporting surface against movement thereon and at the same time clamp the strip in sealing relation with the surface.

A feature of the invention resides in the simplification of the manufacture in that the sealing strip can be extruded or molded and the attaching strip formed in a separate operation and thereafter assembled therewith as required in a simple operation.

The stiff attaching strip can be made of bendable material or may be made of resilient material to provide a spring action if required.

The sealing bead can be of any suitable construction or be made of any suitable compressible material which will deform slightly to produce the required sealing engagement when moved into sealing relation.

Other features and advantages of the invention will be apparent from the specification and claims when considered in connection with the drawings in which:

Figure 1 is a perspective view partly in section of one form of the invention.

Fig. 2 is a sectional view taken through the body of the sealing strip.

Fig. 3 is a sectional view of the sealing strip shown in position on a closure and disposed in sealing relation.

Fig. 4 is a detail of one form of fastening means.

Fig. 5 is a sectional view of another form of the invention.

As illustrated in the drawings, the base 11 of the sealing strip comprises a bottom 12, edge walls 13, 14 and flanges 15, 16 extending from the edge walls 13, 14 with the flanges lying substantially parallel to the bottom and forming a substantially closed channel therein which extends for the length thereof.

The base is made of a resilient material, such as rubber, natural or synthetic, or the usual rubber substitutes as polyvinyl or the like resins, and has sufficient stiffness as to retain its shape in use. The above materials are hereinafter referred to as "resilient rubber-like material." It is particularly well suited for production by an extrusion process but, of course, may be molded or otherwise fabricated.

The base is provided with a sealing bead 17 which may be carried by one of the flanges as shown in Fig. 1 or by the bottom as shown in Fig. 5. The bead can be of any suitable construction and made of any suitable compressible material which will deform slightly when in sealing position, as shown in Fig. 3, to produce the required sealing engagement. For example, the bead can be a hollow tubular construction 17a as shown in Fig. 1, or of sponge rubber 17b as shown in Fig. 5 as required.

When a hollow tubular bead is employed it can be extruded and made integral with the base as the latter is formed as shown in the body section of Fig. 2. When made of sponge rubber it can be vulcanized or otherwise secured to the extruded base as shown in Fig. 5.

According to the present invention the attaching strip 18 which is of a stiff material is separately formed and assembled with the body of the sealing strip. The attaching strip may be of any suitable material and is herein illustrated as being formed of a woven band having resilient wires 18a extending transversely thereof, which strip can be bent when necessary to carry the sealing strip over curved surfaces.

The strip 18 is of a width that is snugly received by the channel in the base, the flanges spreading to permit its ready insertion and thereafter overlying the strip and securely holding it in the channel. The attaching strip is provided with a suitable fastening means 19 by which the sealing strip is mounted on a support. While the fastening means may be formed in any desired manner, it is at present preferred to provide a snap type fastener having a flange 20 provided with prongs 21 which pierce the attaching strip and are bent over and anchored thereto as is usual and which has a bulbous portion 2 projecting from the opposite face of the flange 20 to engage an aperture in a support. The flanges 15, 16 terminate in spaced relation, at least adjacent the fastening means, to permit the fastening means to project therebetween and into engagement with the support.

When the sealing strip is employed as an interior seal as shown in Fig. 3, it is connected to the support 23 about an aperture 24 therein so as to engage a closure 25 when the latter is moved to closed position. It will be noted that the sealing strip is located so that the sealing bead projects into the aperture, and it is secured in this position by the fastening means 19 engaging apertures 26 in the support. The bulbous portion 20 of the fastening means is so positioned that it engages the edge of the aperture and draws the attaching strip toward the support. It not only mounts the sealing strip thereon but clamps and compresses the rubber of the flanges therebetween and seals the space between the support and strip.

The resilience of the attaching strip provides a spring action for forcing the sealing portion 17 into tight sealing engagement with the closure 25.

When the device is secured to a flat surface to form an outer seal, the structure such as shown in Fig. 5 may be employed. In this case the sealing strip is mounted on a surface having apertures therein so as to overlie the surface and form a seal between said surface and an adjoining surface or closure as is well known in the art. When so used, the fastening means on the attaching strip clamps the flanges of the base against the supporting surface in the manner noted above and forms a seal therebetween while the sealing bead 17b will form a seal with the cooperating member.

It will be apparent from the foregoing that I have provided a weather strip which can be quickly and economically manufactured since the body of the strip can be readily molded without the necessity of providing means for supporting the attaching strip therein as has been heretofore required. The attaching strip can be easily assembled in the body and readily held in the channel therein and operate to securely, yet detachably hold the sealing strip in place.

It will be noted that the attaching means are completely concealed and sealed against the entrance of moisture from the exterior by the body of the base and by the sealing action produced by the flanges against the support.

Variations and modifications may be made within the scope of this invention and portions of the improvements may be used without others.

I claim:

1. A sealing strip comprising a base of resilient material having a bottom, edge walls, and flanges extending from said walls over said bottom in parallel relation thereto to form a substantially closed channel therein, one of said flanges having a sealing bead projecting from the outer face thereof; and a stiff attaching strip disposed within the channel and having fastening means projecting therefrom between the flanges to secure the sealing strip to a support, said fastening means drawing said attaching strip toward said support and clamping the flanges to said support.

2. A sealing strip for a closure comprising a base of resilient material, said base having edge walls and flanges extending from said walls over said base and terminating in spaced relation to form a substantially closed channel therealong, one of said flanges having a compressible sealing bead projecting from the outer face thereof, said bead being engaged and compressed in sealing position of the closure; and a stiff attaching strip disposed within the channel and having snap-type fastening means projecting therefrom between the terminals of said flanges to secure the sealing strip to a support.

3. A sealing strip comprising a base of resilient material, said base having edge walls and flanges extending from said walls over said base and terminating in spaced relation to form a substantially closed channel therealong, one of said flanges having a sealing bead projecting from the outer face thereof for a portion of the width; and a stiff attaching strip disposed within the channel and having fastening means projecting therefrom to secure the sealing strip to a support, said fastening means drawing said attaching strip toward said support and clamping the flanges to said support.

4. A sealing strip for a closure comprising a base of stiff resilient rubber, said base having a channel formed therein and substantially closed by flanges and terminating in spaced relation to form a substantially closed channel therealong, one of said flanges having an integral sealing bead projecting from the outer face thereof to engage the closure; a stiff attaching strip disposed within the channel and held therein by said flanges; and snap-type fastening means connected to the attaching strip and projecting therefrom to secure the sealing strip to a support, said fastening means drawing said attaching strip toward said support and compressing the rubber of the flanges between said support and attaching strip to seal the space therebetween.

5. A sealing strip for a closure comprising a base of resilient material having a channel formed therein and substantially closed by integral flanges terminating in spaced relation, one of said flanges having an integral hollow sealing bead projecting from the outer face thereof for a portion of the width; a stiff attaching strip having resilient wires extending transversely thereof, said strips being disposed within the channel; and snap-type fastening means secured to the attaching strip and projecting therefrom to secure the sealing strip to a support, said fastening means drawing said attaching strip toward said support and clamping the flanges to said support to seal the space therebetween, and said resilient attaching strip yieldingly holding the sealing bead in sealing relation with the closure.

LOUIS SPRARAGEN.

References Cited in the file of this patent

UNITED STATES PATENTS

| Number | Name | Date |
|---|---|---|
| 2,102,578 | Gail | Dec. 14, 1937 |
| 2,169,503 | Schlegel | Aug. 15, 1939 |
| 2,193,719 | Foote | Mar. 12, 1940 |
| 2,283,783 | Barr | May 19, 1942 |
| 2,287,606 | Eady | June 23, 1942 |
| 2,596,780 | Meyers et al. | May 13, 1952 |

FOREIGN PATENTS

| Number | Country | Date |
|---|---|---|
| 102,938 | Australia | 1938 |